UNITED STATES PATENT OFFICE.

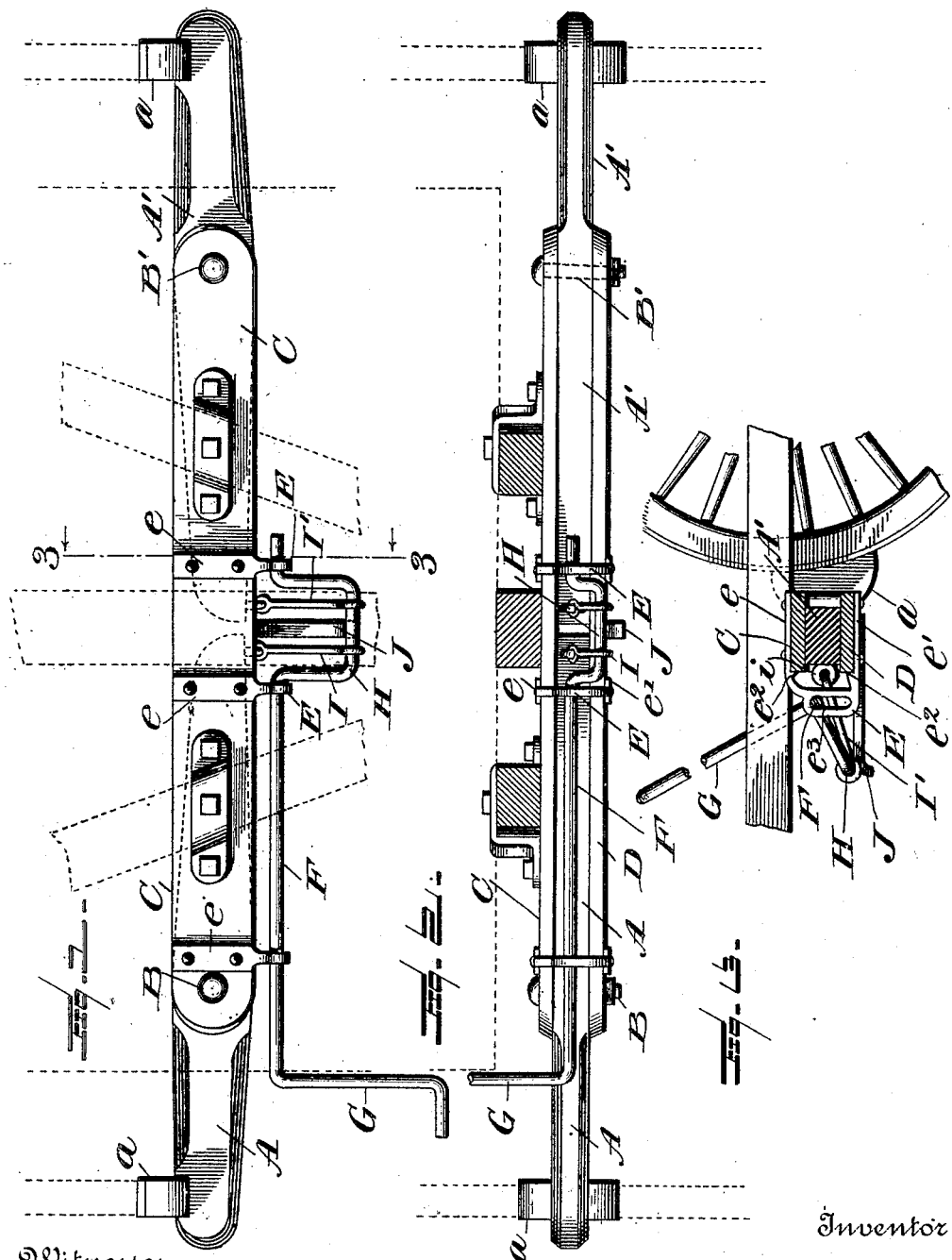

JOHN B. CARY, OF BRUSSELS, ILLINOIS.

WAGON-BRAKE.

SPECIFICATION forming part of Letters Patent No. 647,623, dated April 17, 1900.

Application filed October 9, 1899. Serial No. 733,061. (No model.)

*To all whom it may concern:*

Be it known that I, JOHN B. CARY, a citizen of the United States, residing at Brussels, in the county of Calhoun and State of Illinois, have invented certain new and useful Improvements in Wagon-Brakes; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in brakes, more especially of that class particularly applicable to wagons; and it has for its object to provide a brake which can be easily and quickly applied simply by the movement of the operating handle or lever and which will retain its set or braking position without the employment of a locking means or device requiring manipulation, such as a pawl and ratchet or detent or other analogous device.

A further object is to so construct the brake that the same is set and locked in set or braking position simply by the throwing of the handle.

A further object is to so locate and proportion the parts that when the brake-lever is in braking position the operating lever or crank will be in a "dead-center" position and will prevent the unsetting of the brake-lever by pressure on the same.

A further object is to provide an exceedingly simple and effective brake constructed of the minimum number of parts and one which is durable and effective.

With such and other objects in view the invention is embodied in the parts and novel combinations and arrangement of parts hereinafter described, and particularly set forth in the claims.

In the accompanying drawings I have shown a brake embodying my improvements; but I desire it understood that I do not limit my invention to the precise construction which I have there illustrated simply for the purpose of a proper understanding of the invention.

In the drawings, Figure 1 is a plan view of a brake embodying my improvements. Fig. 2 is a front elevation thereof, and Fig. 3 is a vertical sectional view on line 3 3, Fig. 1.

Referring to the drawings, wherein like letters of reference refer to like parts throughout the several views, A A' indicate brake-levers each provided with a brake-shoe $a$. These brake-levers are pivotally supported at B and B', respectively, and each is located so that when its inner end is drawn forward its outer end will force the shoe carried thereby into contact with one of the hind wheels of the wagon. The pivots B and B' can be supported by any suitable part of the wagon-body or running-gear. In the drawings they are shown as depending from a seat or supporting-plate C, which is intended to be firmly secured to the under side of the rear hounds.

D indicates a supporting and strengthening bar or plate parallel with the plate C and beneath the brake-levers A A' and which is conveniently supported from or secured to the plate C by means of the pivots B B'.

Extending parallel with and supported in suitable bearings E, which are of peculiar construction, to be hereinafter described, and which are secured to the bar D, is a rock-shaft F, having secured thereto or formed therewith at or near its outer end the operating handle or lever G, which extends up beside the wagon-body, where it can be reached and operated. It is evident that if the lever G is not within reach of the driver of the wagon and this is desired suitable connection (not shown) can be provided, bringing the operating-handle within easy reach of a person on the driver's seat. At or near the inner end the rock-shaft F is provided with a crank or offset portion, (indicated at H,) which is shown as being formed by bending the shaft forward and downward, preferably intermediate its ends, so as to provide a bearing on each side of the crank portion. This crank portion H is opposite the inner contiguous ends of the brake-levers A A' and is connected to each of the latter, respectively, by links I I', each of which is pivotally connected to one brake-lever, as by an eyebolt $i$, and to the crank portion H, as by being provided with an eye in which portion H works.

J indicates a stop on the bar D in a position to engage the crank portion H of the rock-shaft and prevent further downward and rearward movement of the said portion after the brake has been set.

From an examination of Fig. 3 of the drawings it will be seen that by rocking the operating-lever forwardly the inner ends of the brake-levers are drawn forward by the crank H and its link connections with the brake-levers, the brake-shoes being thereby applied to the wheels, and that when the crank H is in the position indicated by full lines in said figure it is on the dead-center, thereby locking the levers in their set position, in which position they will remain until the operating-lever is rocked rearward and the shoes moved away from the wheels.

The bearings E above referred to are in the nature of clevices having upper arms $e$, secured, as by bolts, to the upper plate C, and lower arms $e'$, secured, as by bolts, to the lower plate D. The arms of the clevices are provided with bearing-lugs $e^2$, which abut against the sides of the plates C and D.

$e^3$ indicates elongated loops or eyes in which the brake-operating rock-shaft F works, the length of the loops permitting the shaft to move upwardly therein when strain is placed on the shaft, which locks the brakes quicker than if the shaft fitted the bearing-eyes.

Having thus described my invention, what I claim, and desire to secure by Letters Patent, is—

1. The combination with a supporting member, of a brake-lever pivoted on said supporting member, a horizontal rock-shaft mounted in bearings on said supporting member and having a crank, an operating-lever for said shaft, a link connected to said brake-lever and to said crank, the parts being so arranged that when the brake is applied the parts are locked by reason of the position of the crank, substantially as described.

2. The combination with a supporting member, of two oppositely-extending brake-levers pivoted on said supporting member, a horizontal rock-shaft mounted in bearings on said supporting member, and having a crank, links each connecting said crank with one of said brake-levers, an operating-lever for said shaft, the parts being so arranged that when the brakes are applied, the parts are locked by reason of the position of the crank, substantially as described.

3. The combination with a brake-lever, of a rock-shaft, provided with a crank, means connecting said brake-lever and crank, means for operating the rock-shaft, and bearings for said rock-shaft adapted to permit said shaft to move laterally to lock the brake-lever when applied, substantially as described.

4. In a brake, the combination with a supporting seat or plate, of two pivots, a brake-lever pivoted on each pivot, a strengthening plate or bar supported by said pivots, a rock-shaft mounted in bearings on said strengthening-plate and provided with a crank portion, a link connecting each brake-lever with said crank portion, and a stop carried by said strengthening-plate and arranged to engage said crank portion to hold the same in its dead-center position, substantially as and for the purpose set forth.

5. In a brake, the combination of a support, two brake-levers pivoted to said support and extending in opposite directions, a rock-shaft provided with a crank portion, a link extending from said crank portion to each of said brake-levers, bearings on said support for said rock-shaft having elongated bearing-eyes in which the shaft is held and is adapted to slide bodily, and a stop with which said crank portion is adapted to engage to limit the movement thereof, substantially as described.

In testimony whereof I affix my signature in presence of two witnesses.

JOHN B. CARY.

Witnesses:
HERMAN BINKER,
F. C. BAECHT.